US008408270B2

(12) United States Patent
Barton et al.

(10) Patent No.: US 8,408,270 B2
(45) Date of Patent: Apr. 2, 2013

(54) APPARATUSES USEFUL IN PRINTING, FIXING DEVICES AND METHODS OF STRIPPING SUBSTRATES FROM SURFACES IN APPARATUSES USEFUL IN PRINTING

(75) Inventors: Augusto E. Barton, Webster, NY (US); Elias Panides, Whitestone, NY (US); James Padula, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 716 days.

(21) Appl. No.: 12/575,135

(22) Filed: Oct. 7, 2009

(65) Prior Publication Data

US 2011/0079354 A1 Apr. 7, 2011

(51) Int. Cl.
*B32B 38/10* (2006.01)

(52) U.S. Cl. ........ 156/757; 156/708; 156/715; 156/760; 219/216; 399/69; 399/323; 399/328; 399/329; 399/331; 399/330

(58) Field of Classification Search ........................ None
See application file for complete search history.

(56) References Cited

U.S. PATENT DOCUMENTS

| | | | | |
|---|---|---|---|---|
| 6,500,298 | B1 * | 12/2002 | Wright et al. | 156/708 |
| 6,678,496 | B1 * | 1/2004 | Aslam et al. | 399/323 |
| 2003/0039491 | A1 * | 2/2003 | Bogoshian | 399/323 |
| 2005/0008805 | A1 * | 1/2005 | Chen et al. | 428/36.8 |
| 2007/0048035 | A1 * | 3/2007 | Baba et al. | 399/323 |

(Continued)

OTHER PUBLICATIONS

Augusto E. Barton; U.S. Appl. No. 12/512,272, filed Jul. 30, 2009.

(Continued)

*Primary Examiner* — Mark A Osele
*Assistant Examiner* — Nickolas Harm
(74) *Attorney, Agent, or Firm* — Ronald E. Prass, Jr.; Prass LLP

(57) ABSTRACT

Apparatuses useful in printing, fixing devices and methods of stripping media from surfaces in apparatuses useful in printing are provided. An exemplary embodiment of an apparatus useful in printing includes a first member including a first surface; at least one heating element for heating the first surface of the first member; a second member including a second surface forming a nip with the first surface, the nip including an inlet end at which a substrate enters the nip and an outlet end at which the substrate exits from the nip; and an air knife disposed downstream from the outlet end of the nip and extending along an axial direction of the first member, the air knife including a first end, a second end opposite to the first end and a plurality of axially-spaced nozzles disposed between the first end and second end; and at least one gas inlet through which gas is supplied to the air knife. The nozzles are oriented to eject the gas toward the first surface downstream from the outlet end of the nip to facilitate stripping of the substrate from the first surface. The air knife has a configuration and is positioned proximate to the nip such that the substrate does not contact the air knife after exiting the outlet end of the nip when the nozzle gas ejection is ON or OFF.

11 Claims, 8 Drawing Sheets

U.S. PATENT DOCUMENTS

| | | | | |
|---|---|---|---|---|
| 2007/0048042 | A1* | 3/2007 | Uehara et al. | 399/329 |
| 2007/0166084 | A1* | 7/2007 | Yoshino et al. | 399/329 |
| 2007/0172272 | A1* | 7/2007 | Miyata et al. | 399/329 |
| 2007/0177913 | A1* | 8/2007 | Russel et al. | 399/323 |
| 2007/0206981 | A1* | 9/2007 | Amico et al. | 399/323 |
| 2008/0037069 | A1 | 2/2008 | Mestha et al. | |
| 2008/0063441 | A1* | 3/2008 | Burton et al. | 399/323 |
| 2009/0003896 | A1* | 1/2009 | Domoto et al. | 399/323 |
| 2009/0087234 | A1* | 4/2009 | Roof et al. | 399/323 |
| 2009/0110415 | A1* | 4/2009 | Roof | 399/33 |
| 2009/0304419 | A1* | 12/2009 | Roof et al. | 399/323 |
| 2010/0178086 | A1* | 7/2010 | Ruiz et al. | 399/323 |

OTHER PUBLICATIONS

Christine A. Keenan et al.; U.S. Appl. No. 12/352,250, filed Jan. 12, 2009.

William A. Burton et al.; U.S. Appl. No. 12/363,724, filed Jan. 31, 2009.

Anthony S. Condello et al.; U.S. Appl. No. 12/490,601, filed Jun. 24, 2009.

* cited by examiner

APPARATUSES USEFUL IN PRINTING, FIXING DEVICES AND METHODS OF STRIPPING SUBSTRATES FROM SURFACES IN APPARATUSES USEFUL IN PRINTING

BACKGROUND

In some printing apparatuses, images are formed on substrates using a marking material. Such printing apparatuses can include a belt that defines a nip. Substrates are fed to the nip and subjected to processing conditions to fix the marking material onto the substrates.

It would be desirable to provide apparatuses useful in printing and methods that can strip substrates from surfaces effectively.

SUMMARY

Apparatuses useful in printing, fixing devices and methods of stripping substrates from surfaces in apparatuses useful in printing are provided. An exemplary embodiment of the apparatuses useful in printing comprises a first member including a first surface; at least one heating element for heating the first surface of the first member; a second member including a second surface forming a nip with the first surface, the nip including an inlet end at which a substrate enters the nip and an outlet end at which the substrate exits from the nip; and an air knife disposed downstream from the outlet end of the nip and extending along an axial direction of the first member, the air knife including a first end, a second end opposite to the first end and a plurality of axially-spaced nozzles disposed between the first end and second end; and at least one gas inlet through which gas is supplied to the air knife. The nozzles are oriented to eject the gas toward the first surface downstream from the outlet end of the nip to facilitate stripping of the substrate from the first surface. The air knife has a configuration and is positioned proximate to the nip such that the substrate does not contact the air knife after exiting the outlet end of the nip when the nozzle gas ejection is ON or OFF.

DRAWINGS

DETAILED DESCRIPTION

Figure 1:
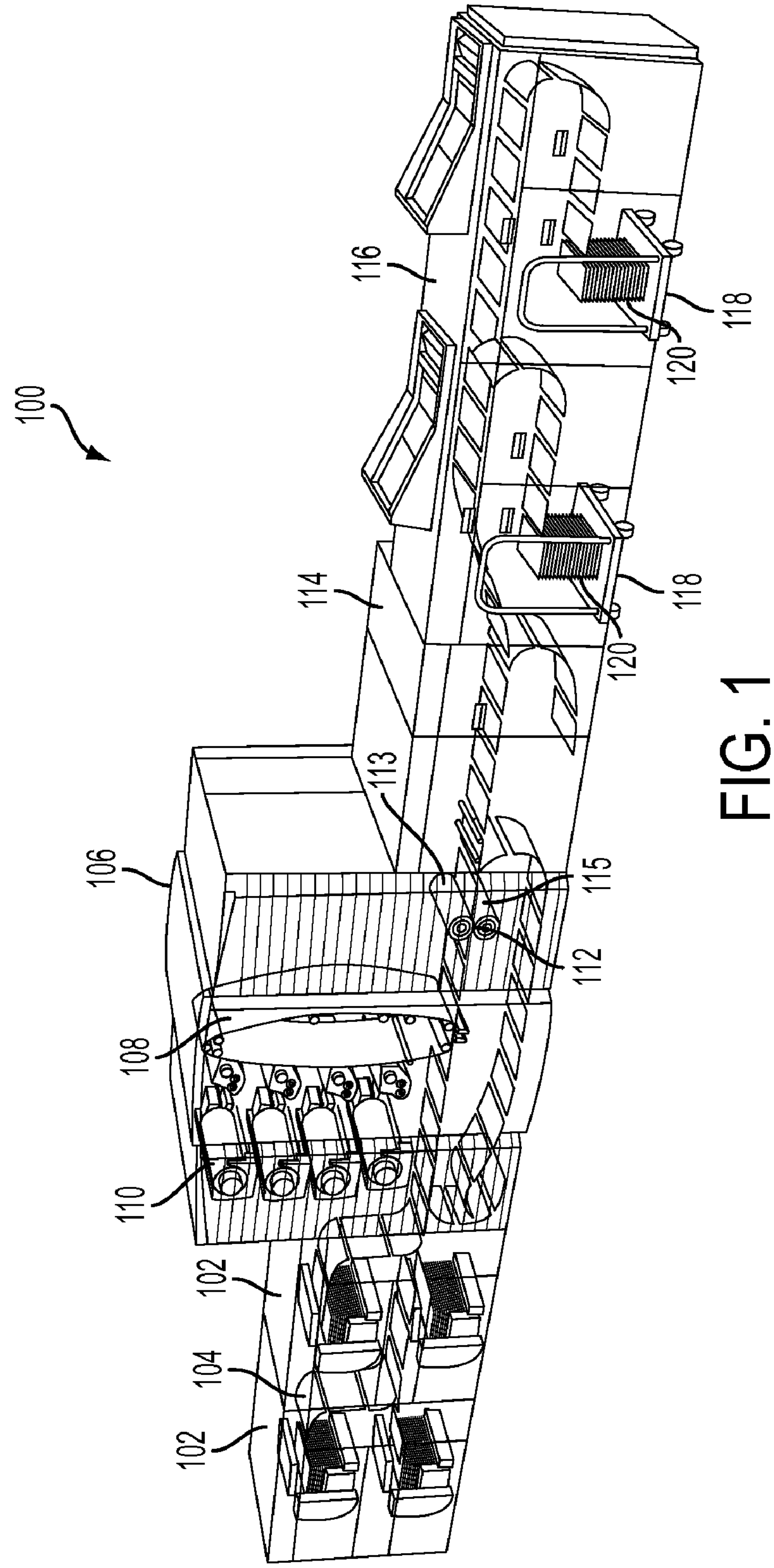
FIG. 1 depicts an exemplary embodiment of a printing apparatus.

The disclosed embodiments include an apparatus useful in printing. The apparatus comprises a first member including a first surface; at least one heating element for heating the first surface of the first member; a second member including a second surface forming a nip with the first surface, the nip including an inlet end at which a substrate enters the nip and an outlet end at which the substrate exits from the nip; and an air knife disposed downstream from the outlet end of the nip and extending along an axial direction of the first member, the air knife including a first end, a second end opposite to the first end and a plurality of axially-spaced nozzles disposed between the first end and second end; and at least one gas inlet through which gas is supplied to the air knife. The nozzles are oriented to eject the gas toward the first surface downstream from the outlet end of the nip to facilitate stripping of the substrate from the first surface. The air knife has a configuration and is positioned proximate to the nip such that the substrate does not contact the air knife after exiting the outlet end of the nip when the nozzle gas ejection is ON or OFF.

The disclosed embodiments further include a fixing device for fixing marking material on substrates. The fixing device comprises a first member including a first surface; at least one heating element for heating the first surface; a second member including a second surface forming a nip with the first surface, the nip including an inlet end at which a substrate enters the nip and an outlet end at which the substrate exits from the nip; and an air knife disposed downstream from the outlet end of the nip and extending along an axial direction of the first member. The nozzles are oriented to eject the gas toward the first surface downstream from the outlet end of the nip to facilitate stripping of the substrate from the first surface. The air knife has a configuration and is positioned proximate to the nip such that the substrate does not contact the air knife after exiting the outlet end of the nip when the nozzle gas ejection is ON or OFF.

The disclosed embodiments further include a method of stripping substrates from a surface in an apparatus useful in printing. The method comprises feeding a substrate having marking material thereon to an inlet end of a nip formed by a first surface of a first member and a second surface of a second member, the substrate contacting the first surface and the second surface at the nip; heating the first surface of the first member; supplying gas to at least one gas inlet of an air knife disposed downstream from an outlet end of the nip and extending along an axial direction of the first member, the air knife including a first end, a second end opposite to the first end and a plurality of axially-spaced nozzles disposed between the first end and second end; and optionally ejecting the gas toward the first surface downstream from the outlet end of the nip to facilitate stripping of the substrate from the first surface after exiting the nip at the outlet end, the air knife having a configuration and being positioned proximate to the nip such that the substrate does not contact the air knife after exiting the outlet end of the nip when the nozzle ejects the gas or when the nozzle does not eject the gas.

FIG. 1 illustrates an exemplary printing apparatus 100 disclosed in U.S. Patent Application Publication No. 2008/0037069, which is incorporated herein by reference in its entirety. The printing apparatus 100 includes two paper feeder modules 102 arranged in series, a printer module 106 adjacent the paper feeder modules 102, an inverter module 114 adjacent the printer module 106, and two stacker modules

116 arranged in series adjacent the inverter module 114. In the printing apparatus 100, the paper feeder modules 102 feed substrates to the printer module 106. In the printer module 106, toner is transferred from a series of developer stations 110 to a charged photoreceptor belt 108 to form toner images on the photoreceptor belt 108 and produce prints. The toner images are transferred to respective substrates 104 fed through the paper path. The substrates are advanced through a fuser 112 including a fuser roll 113 and a pressure roll 115, which form a nip where heat and pressure are applied to the substrates to fuse toner images onto the substrates. The inverter module 114 manipulates substrates exiting the printer module 106 by either passing the substrates through to the stacker modules 116, or inverting and returning the substrates to the printer module 106. In the stacker modules 116, the printed substrates are loaded onto stacker carts 118 to form stacks 120.

Apparatuses useful in printing, fixing devices and methods of stripping substrates in apparatuses useful in printing are provided. Embodiments of the apparatuses are constructed to allow different types of marking material to be treated on different types of substrates. Embodiments of the apparatuses include a belt. The belt can be heated to supply thermal energy to substrates that contact the belt. Embodiments of the apparatuses are constructed to allow different types of substrates to be stripped from the belt.

The apparatuses useful in printing and fixing devices include an air knife. The air knives emit a suitable gas, such as air, to facilitate stripping of substrates from the belt after the substrates pass through the nip. Embodiments of the air knife are configured to have a sufficiently-low profile to not intrude into the exit path of different types of substrates. Embodiments of the air knives can also provide uniform air flow ejection performance from all nozzles.

Embodiments of the apparatuses useful in printing may include a printing apparatus, such as shown in FIG. 1; a portion of a printing apparatus, such as a fixing device; or another type of apparatus that forms images on substrates, such as copiers, facsimile machines, multi-function machines, and the like, or portions thereof.

The apparatuses useful in printing can use various types of solid and liquid marking materials, including toners and inks (e.g., liquid inks, gel inks, heat-curable inks and radiation-curable inks), and the like. The apparatuses can use various thermal, pressure and other process conditions to treat marking materials on substrates.

Figure 2:
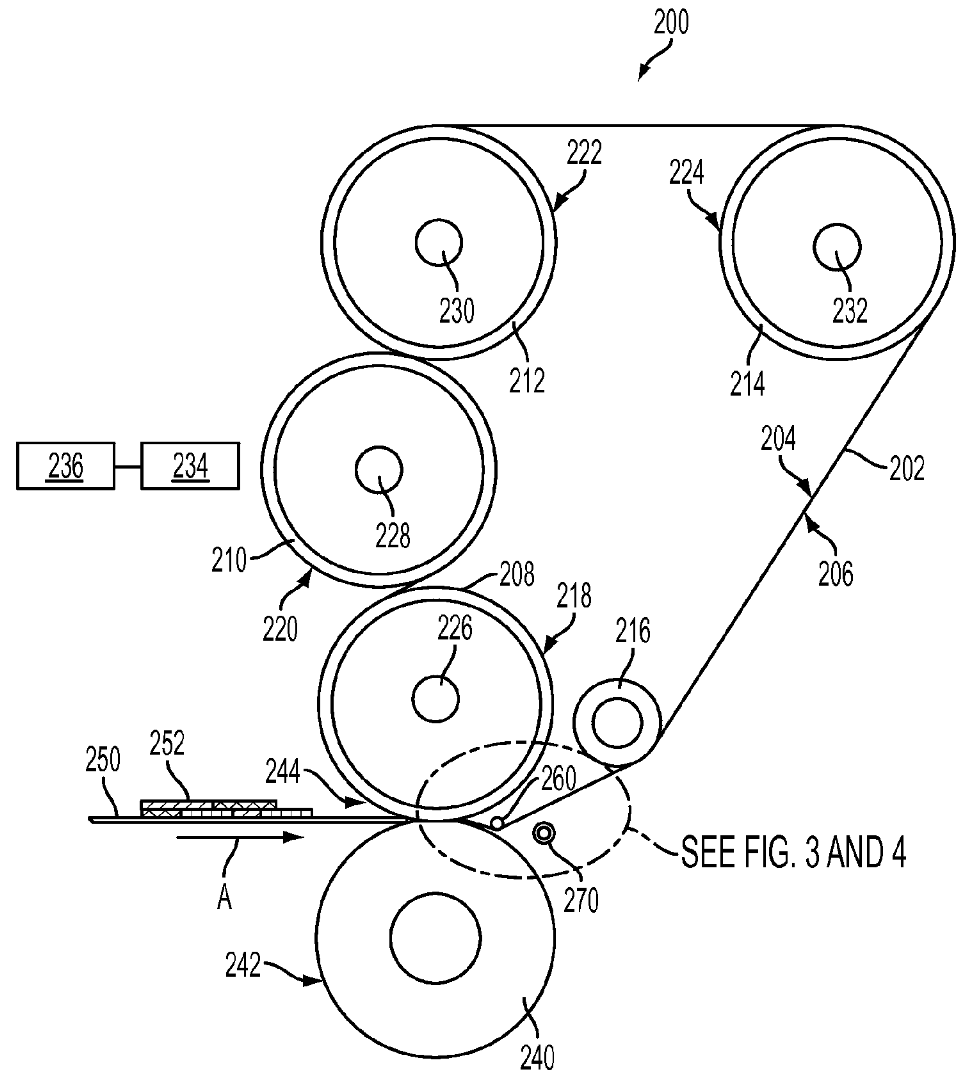
FIG. 2 depicts an exemplary embodiment of a fixing device including a stripping device and an air knife.

FIG. 2 illustrates an exemplary embodiment of a fuser 200 constructed to fix marking materials onto substrates and to strip the substrates. Embodiments of the fuser 200 can be used in different types of printing apparatuses. For example, the fuser 200 can be used in place of the fuser 112 in the printing apparatus 100 shown in FIG. 1.

As shown in FIG. 2, the fuser 200 includes a continuous belt 202 having an inner surface 204 and an outer surface 206. The belt 202 is supported on a fuser roll 208, an external roll 210, internal rolls 212, 214 and an idler roll 216. The fuser roll 208, external roll 210 and internal rolls 212, 214 have outer surfaces 218, 220, 222 and 224, respectively, contacting the belt 202.

The fuser roll 208, external roll 210 and internal rolls 212, 214 include internal heating elements 226, 228, 230 and 232, respectively, connected to a power supply 234. The power supply 234 is connected to a controller 236 that controls the supply of voltage to the heating elements 226, 228, 230 and 232, to heat the belt 202 to the desired temperature.

The fuser 200 further includes an external pressure roll 240 having an outer surface 242. The outer surface 242 is shown engaging the outer surface 206 of the belt 202 to form a nip 244. Embodiments of the pressure roll 240 can include a core, an inner layer overlying the core, and an outer layer overlying the inner layer and forming the outer surface 242. The core can be comprised of aluminum, steel or the like, the inner layer of an elastomeric material, such as silicone rubber, or the like, and the outer layer of a low-friction polymer, such as polytetrafluoroethylene (Teflon®), or the like.

Embodiments of the belt 202 can include two or more layers. For example, the belt 202 can include a base layer forming the inner surface 204, an intermediate layer on the base layer, and an outer layer on the intermediate layer and forming the outer surface 206. In an exemplary embodiment, the base layer can be comprised of a polymer, such as polyimide, or the like; the intermediate layer of silicone, or the like; and the outer layer of a polymer, such as a fluoroelastomer sold under the trademark Viton® by DuPont Performance Elastomers, L.L.C., polytetrafluoroethylene, or the like.

In embodiments, the belt 202 can have a thickness of about 0.1 mm to about 0.5 mm, such as less than about 0.2 mm. For example, the belt 202 can include a base layer having a thickness of about 50 μm to about 100 μm, an intermediate layer having a thickness of about 100 μm to about 500 μm, and an outer layer having a thickness of about 20 μm to about 40 μm. The belt 202 can typically have a width dimension along the longitudinal axis of the fuser roll 208 of about 350 mm to about 450 mm.

FIG. 2 depicts a substrate 250 being fed to the nip 244 in the process direction A. The fuser roll 208 is rotated counter-clockwise and the pressure roll 240 is rotated clockwise to rotate the belt 202 counter-clockwise and convey the substrate 250 through the nip 252. Substrates used in the fuser 200 can have a weight ranging from light-weight to heavy-weight, and can be coated or uncoated. For example, the substrate 250 can be a coated or uncoated paper sheet. Light-weight paper typically has a weight of $\leqq$ about 75 gsm, substrate-weight paper a weight of about 75 gsm to about 160 gsm, and heavy-weight paper a weight of $\geqq$160 gsm.

As shown in FIG. 2, the fuser 200 further includes a stripping device 260 and an air knife 270. The fuser 200 shown in FIG. 2, the exemplary stripping device 260 comprises a tensioned stripping wire. The stripping wire can have a diameter of less than about 2 mm, for example. The stripping wire can comprise a coating of a low-friction material effective to reduce wear of the inner surface 204 of the belt 202 during rotation of the belt 202. Embodiments of stripping devices including a stripping wire that can be used as the stripping device 260 are disclosed in U.S. patent application Ser. No. 12/512,272 filed on Jul. 30, 2009, which is incorporated herein by reference in its entirety. The stripping device 260 is located internally to the belt 202, i.e., on the side of the inner surface 204. The stripping device 260 facilitates stripping of substrates from the outer surface 206 of the belt 202 after the substrates pass through the nip 244.

In other embodiments of the fixing devices, the stripping device 260 can comprise a stripping device as disclosed in U.S. patent application Ser. No. 12/352,250 filed on Jan. 12, 2009 and Ser. No. 12/363,724 filed on Jan. 31, 2009, each of which is incorporated herein by reference in its entirety.

In the illustrated embodiment of the fuser 200, the stripping device 260 and air knife 270 both facilitate stripping of substrates from the outer surface 206 of the belt 202.

Figure 3:
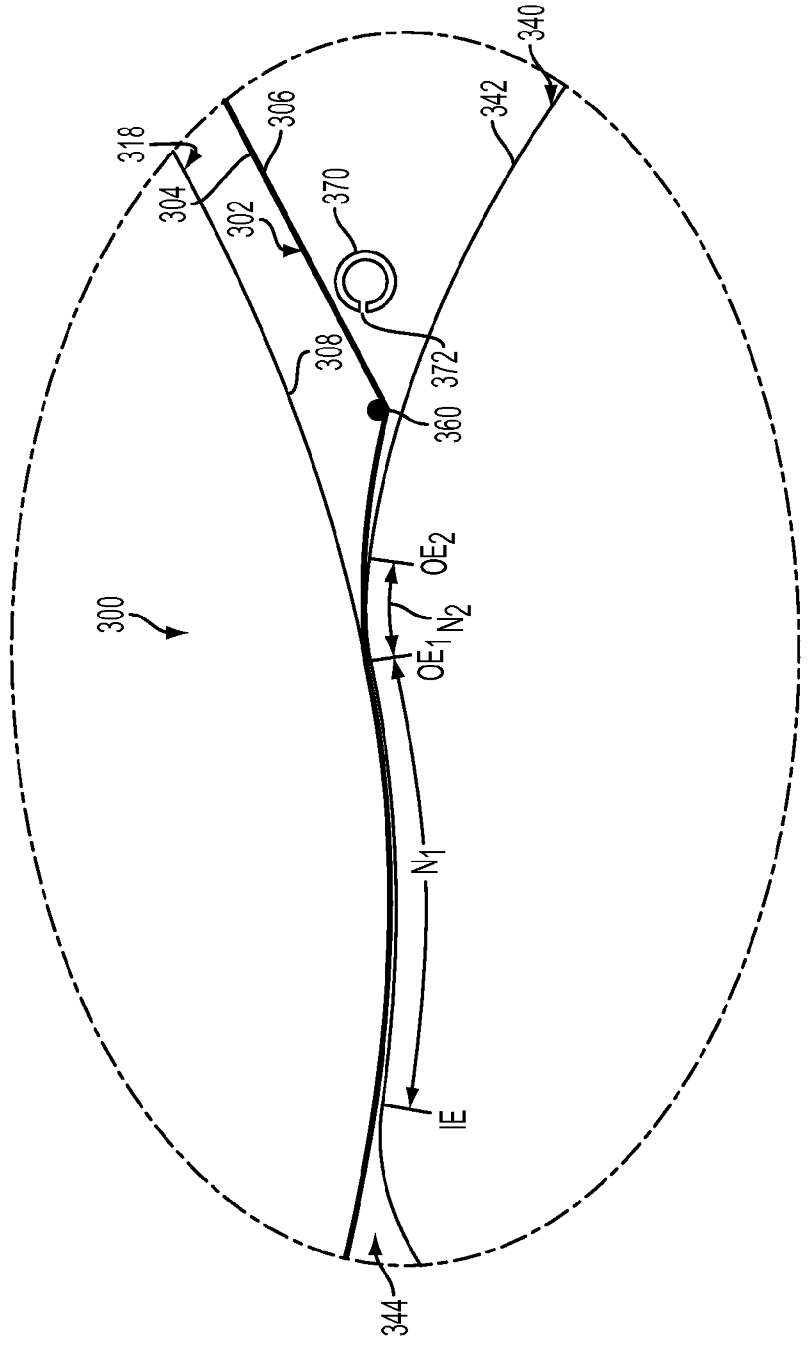
FIG. 3 is an enlarged view of the nip region of the fixing device shown in FIG. 2, including an exemplary air knife with a circular cross-section.

FIG. 3 depicts a portion of a fuser 300 including a fuser roll 308, belt 302, pressure roll 340, stripping device 360 and an exemplary embodiment of an air knife 370. The fuser roll 308, belt 302 and pressure roll 340 can have the same construction as the fuser roll 208, belt 202 and pressure roll 240, respectively, shown in FIG. 2, for example.

The belt 302 is located between the outer surface 318 of the fuser roll 308 and the outer surface 342 of the pressure roll 340. A nip 344 is formed between the fuser roll 308 and pressure roll 340. The nip 344 includes a first nip $N_1$ extending between an inlet end, IE, and an outlet end $OE_1$ disposed downstream from the inlet end IE. Substrates are fed to the inlet end IE and exit at the outlet end $OE_1$. At the first nip $N_1$, the belt 302 contacts the outer surface 318 of the fuser roll 308 and the outer surface 342 of the pressure roll 340. The belt 302 diverges from the outer surface 318 of the fuser roll 308 at the outlet end $OE_1$ of the first nip $N_1$. The first nip $N_1$ is a high-pressure region at which thermal energy and pressure are applied to substrates. A marking material, such as toner, can be fixed onto substrates at the first nip $N_1$.

As shown in FIG. 3, the nip 344 further includes a second nip, $N_2$, adjacent to the first nip $N_1$. The second nip $N_2$ extends from about the outlet end $OE_1$ of the first nip $N_1$ to an outlet end $OE_2$, disposed downstream from the outlet end $OE_1$. The belt 302 diverges from the outer surface 342 of the pressure roll 340 at the outlet end $OE_2$.

The stripping device 360 is located downstream from the outlet end $OE_2$ of the second nip $N_2$. Substrates are stripped from the outer surface 306 of the belt 302 adjacent to the stripping device 360. The stripping device 360 is located sufficiently close to the outlet end $OE_1$ of the first nip $N_1$ to allow substrates to be stripped from the belt 302 shortly after exiting the first nip $N_1$.

In embodiments, the stripping device 360 can include a stripping wire extending along the axial direction of the fuser 300. The stripping wire has a sufficient length to contact the inner surface 304 of the belt 302 across the entire width of the belt 302. The stripping wire is tensioned sufficiently to maintain the belt spaced from the outer surface 318 of the fuser roll 308. The stripping wire produces a stripping force effective to facilitate stripping of substrates from the outer surface 306 of the belt 302 adjacent to the stripping device 360. For a stripping wire having a circular cross-section, decreasing the diameter of the stripping wire increases the magnitude of the stripping force it produces. Thin substrates are typically the most difficult substrates to strip from the belt 302. The stripping wire can have a small diameter to provide a high stripping force to facilitate stripping of such light-weight substrates from the belt 302. In contrast, heavy-weight substrates are typically easiest to strip. In embodiments, the stripping wire can have a larger diameter that produces a lower stripping force to facilitate stripping of such heavy-weight substrates from the belt 302.

The exemplary air knife 370 shown in FIG. 3 has a circular cross-section. The air knife 370 is hollow and has an outer diameter 374 and an inner diameter 376 defining a wall. The hollow interior is a plenum. Embodiments of the air knife 370 have a small cross-section and a thick wall. Typically, the outer diameter 374 can be from about 5 mm to about 50 mm. The air knife 370 includes a plurality of nozzles 372 (only one nozzle 372 is shown) disposed along the length of the air knife 370. The nozzles 372 are oriented to eject gas, such as air, or the like, toward the outer surface 306 of the belt 302 in the vicinity of the location where the inner surface 302 of the belt 302 contacts the stripping device 360. The gas ejected by the air knife 370 produces a substrate stripping force that supplements the stripping force produced by the stripping device 360 to assist in stripping of substrates from the outer surface 306 of the belt 302. By operation of the air knife 370, the stripping force provided by the stripping device 360 can be reduced and the air knife 370 can function as the primary stripping mechanism in the fuser 300. For example, the diameter of a stripping wire can be increased to reduce the stripping force produced by the stripping wire. By using a larger-diameter stripping wire, wear of the belt 302 can be reduced. The small cross-section of the air knife 370 allows it to be positioned close to the belt 302 to provide an increased stripping air flow.

In the air knife 370, the nozzles 372 each extend in the radial direction through the wall between the outer diameter 374 and inner diameter 376. The air knife 370 can typically include 3 to about 16 or more nozzles to provide the desired gas flow characteristics along the width of the belt 302. The nozzles 372 are typically aligned with each other along the length of the air knife 370. The nozzles 372 can be substantially equidistantly spaced from each other along the length of the air knife 370. In other embodiments, the nozzles 372 can have other patterns to provide other desired gas flow characteristics at one or more locations along the width of the belt 302. The nozzles 372 can typically have a diameter of about 0.5 mm to about 1.5 mm. The nozzles 372 can typically have the same, or approximately the same, cross-sectional flow area (e.g., diameter) to provide substantially equal air flow from each of the nozzles 372.

Other embodiments of the air knife can have a different cross-sectional shape than the circular shape shown in FIG. 3 and provide a desired low-profile and gas flow characteristics. The cross-section of the air knives can be selected based on the shape of the space in the apparatus in which they are incorporated.

Figure 4:
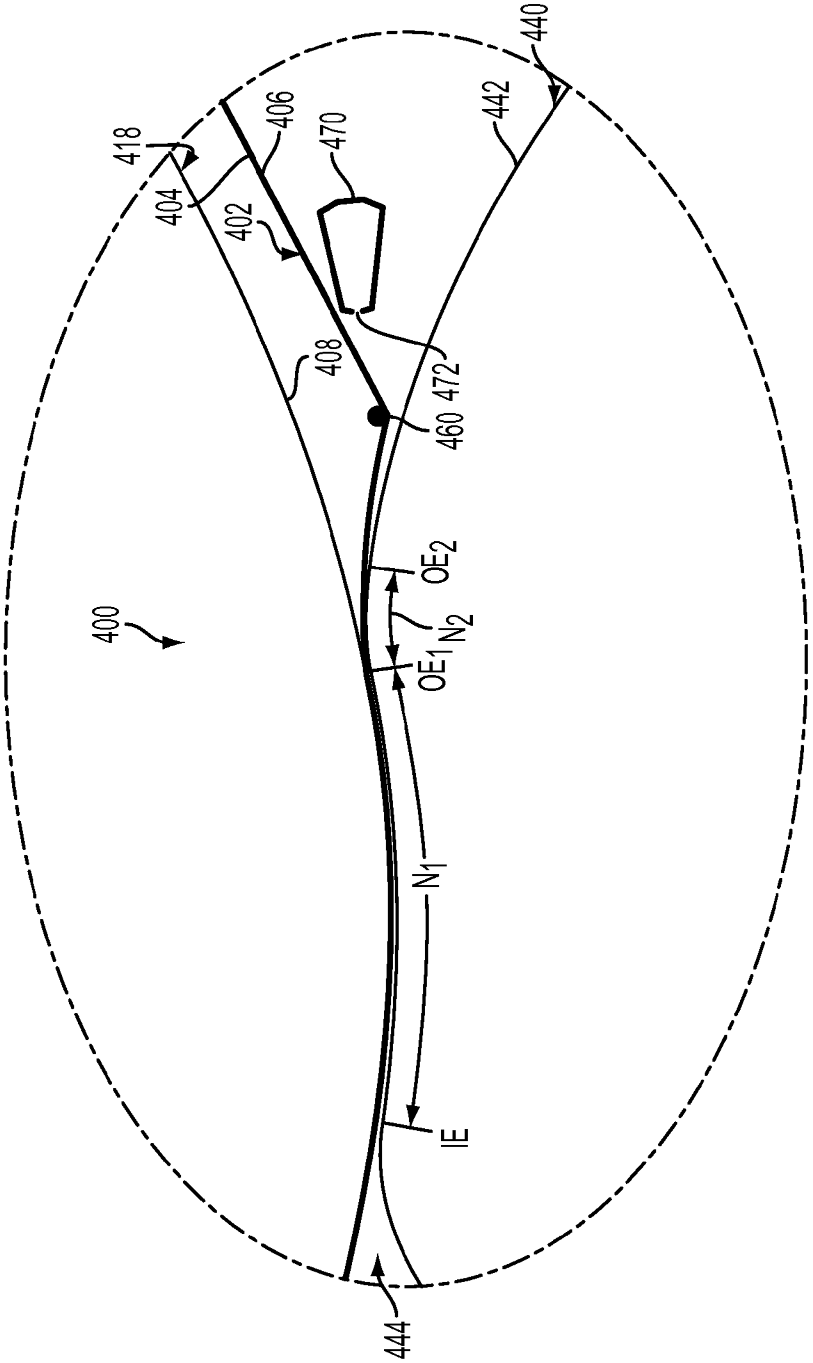
FIG. 4 is an enlarged view of a nip region of a fixing device including an exemplary air knife with a triangular cross-section.

For example, FIG. 4 depicts a portion of a fuser 400 including a fuser roll 408, belt 402, pressure roll 440 and a stripping device 460. The fuser roll 408, belt 402 and pressure roll 440 can have the same construction as the fuser roll 208, belt 202 and pressure roll 240, respectively, shown in FIG. 2, for example. FIG. 4 also shows another exemplary embodiment of an air knife 470 having a generally triangular cross-section. The knife 470 includes an internal plenum. The air knife 470 includes a plurality of nozzles 472 (only one nozzle 472 is shown in FIG. 4). The inner cross-sectional area of the air knife 470 can be at least about 5 times the total cross-sectional area of the holes of the nozzles 472. The nozzles 472 are typically aligned with each other along the length of the air knife 470. The nozzles 472 can be approximately, equally-spaced from each other along the length of the air knife 470, or the nozzles can be more concentrated at the center or edges depending on stripping requirements, and can have about the same cross-sectional flow area. The nozzles 472 are oriented to eject gas, such as air, or the like, toward the outer surface 406 of the belt 402 opposite to where the inner surface 404 of the belt 402 contacts the stripping surface 462 of the stripping device 460. The stripping device 460 can include a tensioned stripping wire, for example. The gas ejected by the air knife 470 assists in stripping of substrates from the outer surface 406 of the belt 402.

Figure 5:
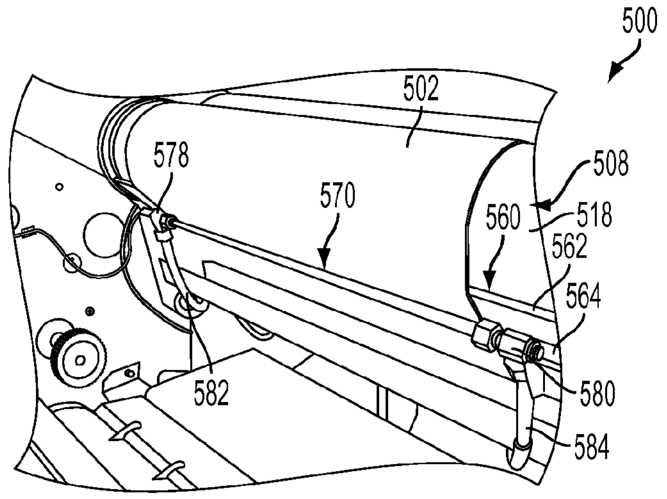
FIG. 5 depicts a portion of an exemplary fixing device including an air knife.

FIG. 5 shows a portion of a fuser 500 including a belt 502 supported on a fuser roll 508. The fuser 500 includes a stripping device 560 disposed between the outer surface 518 of the fuser roll 508 and the belt 502.

An air knife 570 is disposed external to the belt 502. The air knife 570 has a circular cross-section like the air knife 370 shown in FIG. 3. The air knife 570 includes a plurality of nozzles 572 positioned along the length of the air knife 570. The air knife 570 includes a first gas inlet 578 at one end and a second gas inlet 580 at the opposite end. The first gas inlet 578 and the second gas inlet 580 are in fluid communication with a source of pressurized gas (not shown) via gas supply lines 582, 584, respectively. By feeding the gas from both ends of the air knife 570 with the first gas inlet 578 and the second gas inlet 580, entrance losses are reduced, which results in a substantially uniform gas pressure distribution with the tubular portion of the air knife 570, which in turn can ensure substantially identical gas flow characteristics for each nozzle.

Figure 6:
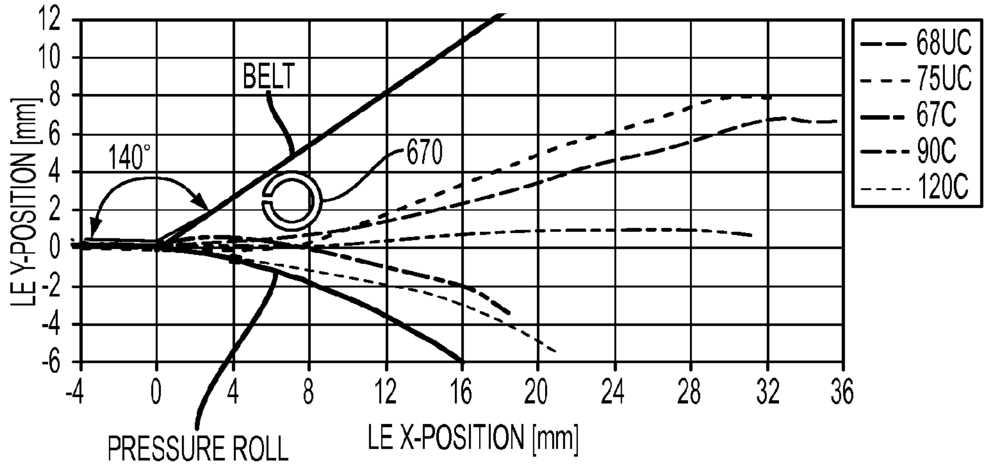
FIG. 6 shows curves illustrating the relationship between the y-position of the lead edge of substrates and the x-position of the lead edge of coated and un-coated substrates having different weights in a fixing device including a pressure roll, belt and an air knife.

FIG. 6 depicts typical nip exit trajectories of different types of paper A to E used in a fixing device. As shown, the fixing device includes a pressure roll, belt and an air knife having a small cross-section according to an exemplary embodiment. In the fixing device, the second nip, $N_2$, formed by contact between the belt and the pressure roll has a length of 7.2 mm. The fixing device includes a stripping device (not shown) having a stripping radius of 1 mm (e.g., a stripping wire having a diameter of 2 mm). As shown, the belt diverges from the pressure roll at an angle of 140° relative to the horizontal. The papers used are 68 gsm uncoated (68 UC), 75 gsm uncoated (75 UC), 67 gsm coated (67 C), 90 gsm coated (90 C) and 120 gsm coated (120 C). The x-position and y-position of the leading edge (LE) of the papers are shown with the x=0, y=0 position being the location at which the belt diverges from the pressure roll.

As shown in FIG. 6, 68 gsm, light-weight uncoated paper can lift up to about 8 mm after exiting the nip. For such light-weight substrates, an air knife is normally needed to reduce such lift when the belt has been used for a large number of prints and the belt release properties have become degraded. As depicted in FIG. 6, the light-weight uncoated paper does not contact the low-profile air knife 670. Heavier substrates, such as 75 gsm un-coated paper, and 67 gsm, 90 gsm and 120 gsm coated papers, do not typically need an air knife to reduce their lift even when the belt has been used for a large number of prints.

However, it has been noted that such heavier un-coated and coated substrates may not properly exit fusers that include a bulky air knife with a large cross-section. Such substrates can collide with the air knife and consequently become damaged and also produce jams.

Figure 7:
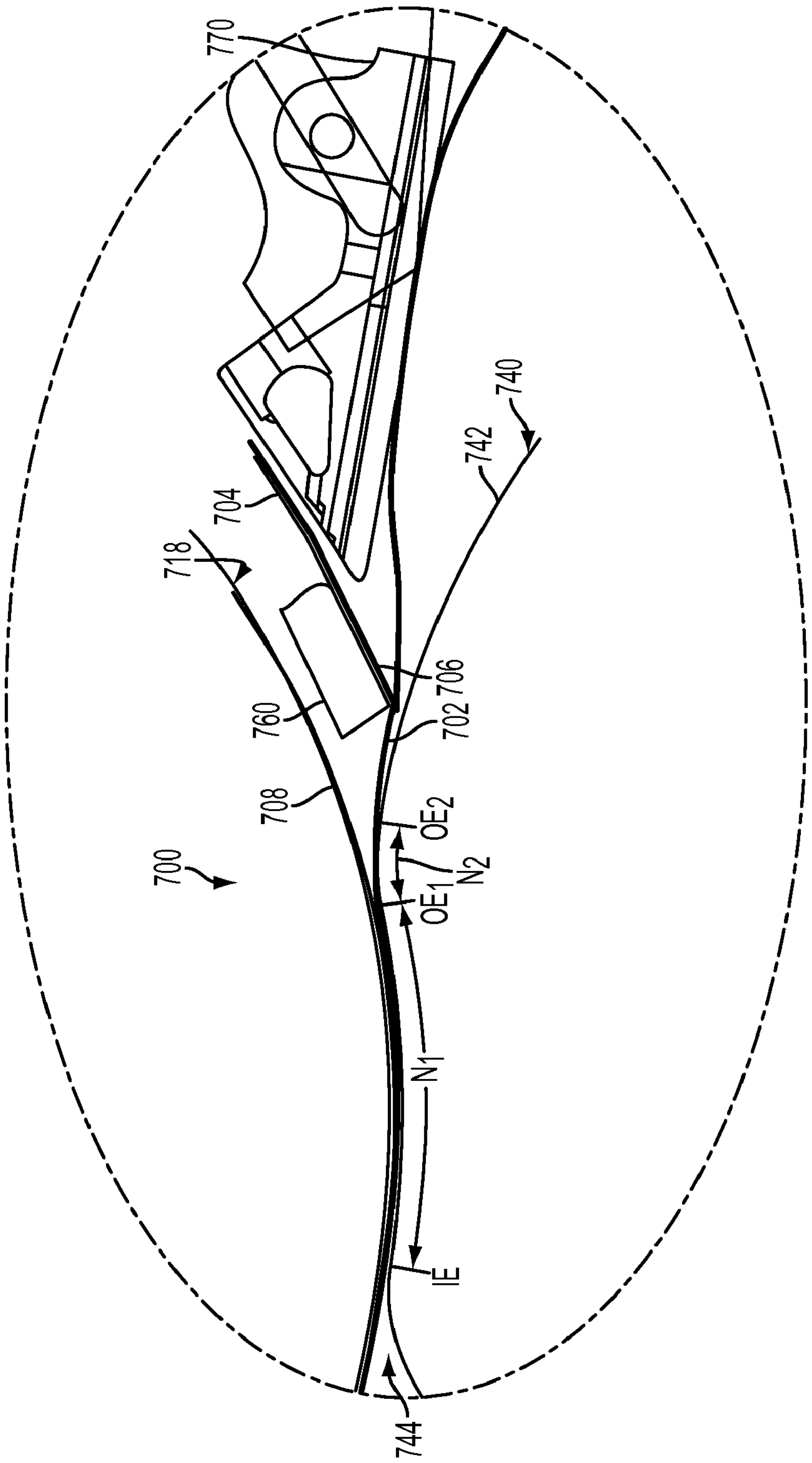
FIG. 7 depicts a portion of a fixing device including a stripping device and a large-profile air knife.

FIG. 7 depicts a fuser including a fuser roll 708, belt 702, pressure roll 740, stripping device 760 and an air knife 770. The air knife 770 has a large cross-section and combines the functions of substrate stripping device and an exit baffle. The large cross-section of the air knife 770 protrudes into the exit path of substrates. A substrate 790 is shown riding over the bottom surface 792 of the air knife 770. Such collisions of substrates with the air knife 770 can cause jams unless the air knife 770 is kept ON. Due to the large cross-section of the air knife 770, the air flow is typically kept ON at all times, even when using self-stripping paper in print jobs, in order to try to prevent damaging the prints or jamming. However, even when the air knife 770 is ON, med-weight to heavy-weight substrates may still collide with the bottom surface 792 of the air knife 770 when exiting the fuser.

In contrast to the air knife 770 having a large cross-section, each of the air knives 370, 470 and 570 shown in FIGS. 3, 4 and 5 has a sufficiently-low profile to allow it to be positioned close to the fuser roll 208. The small cross-section of the air knives 370, 470 and 570 can also prevent different types of substrates (light-weight to heavy-weight) traveling along the exit path from colliding with them when the air knives 370, 470 and 570 are either ON or OFF. The low-profile configuration of the air knives 370, 470 and 570 allows the gas flow to be turned OFF when self-stripping substrates, such as heavy-weight paper, are run in the apparatus, without producing jams. In addition, the air knives 370, 470 and 570 can provide a distribution of gas flow by feeding gas from both ends of the air knives 370, 470 and 570.

Embodiments of the low-profile air knives, such as air knives 370, 470 and 570, allow an independent baffle to be used at an optimal location in apparatuses useful in printing. The independent baffle can be a flat surface, a flat surface with ridges, or the like. The ridges can limit air speed by providing a minimum exit area for the air flow. Consequently, exiting media will experience a limited Bernoulli effect (i.e., a reduction of the static pressure in the presence of moving air). If the air speed on the top of a sheet is larger than on the bottom of the sheet, then a vacuum is possible due to the existence of a differential static pressure, as the static pressure is lower on the side of the sheet with the highest air speed.

Figure 8:
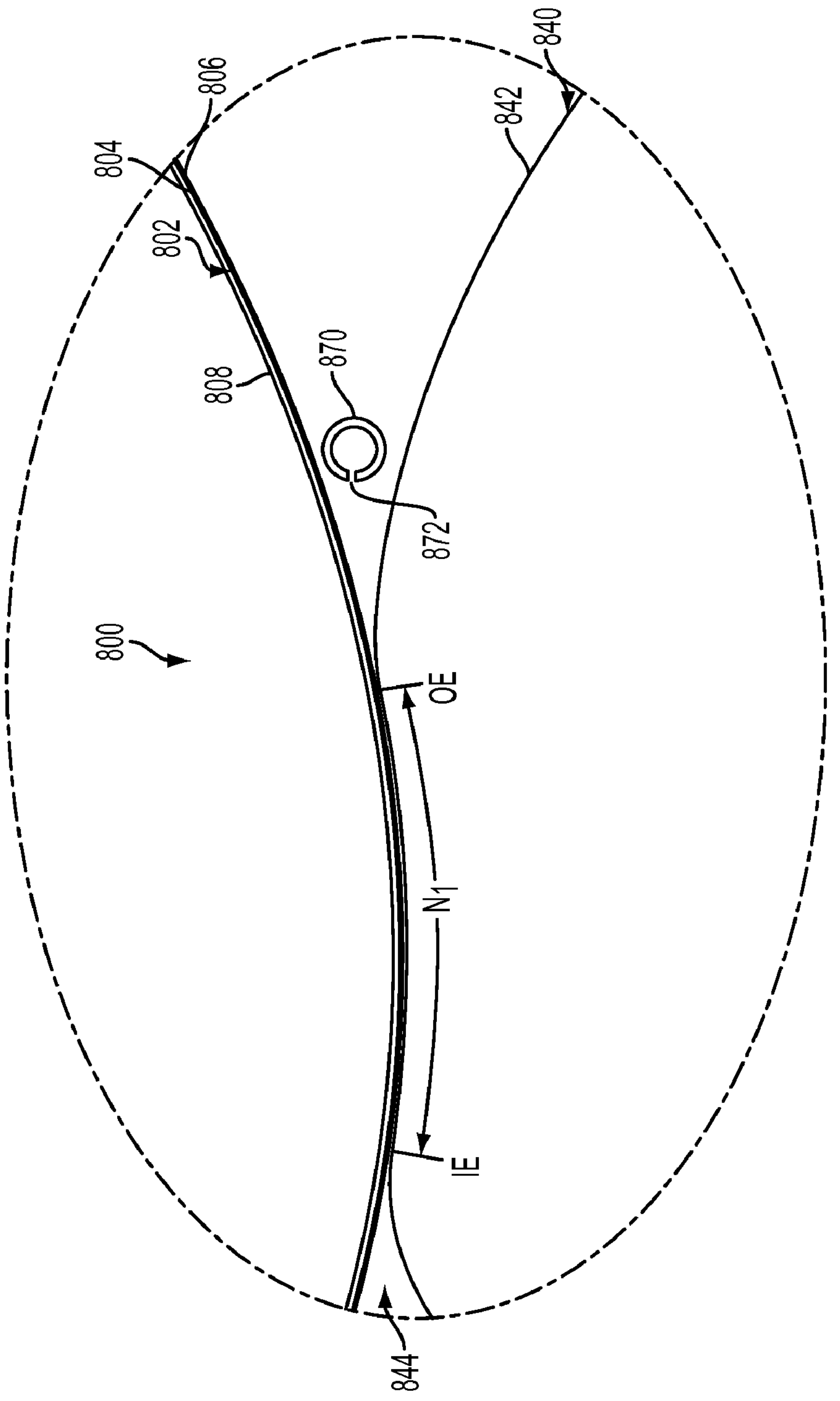
FIG. 8 depicts a portion of an exemplary embodiment of a fixing device including a fuser roll, pressure roll and an air knife.

Other embodiments of the fixing devices do not include a stripping element (such as one of the stripping devices 260, 360 and 560) other than the air knife to assist stripping of substrates from a belt. FIG. 8 depicts a portion of a fuser 800 according to an exemplary embodiment. The fuser 800 includes a fuser roll 808, belt 802, pressure roll 840 and an air knife 870. In the fuser 800, the nip 844 does not include a secondary nip $N_2$ as shown in FIGS. 3 and 4, and the belt 802 remains in contact with the outer surface 818 of the fuser roll 808 after the belt 802 passes through the nip 844. In the embodiment, the air knife 870 can be positioned close to the belt 802. In the fuser 800, the air knife 870 provides a sufficient stripping force to strip substrates used in the fuser 800.

Embodiments of the air knives can be used in fixing devices including belts and having a different construction than the fuser 200 shown in FIG. 2. For example, the air knives can be used in fixing devices that include a drive roll, such as a pressure roll, and a continuous belt supported on a stationary support structure. The belt can be free-spinning about the support structure and caused to rotate by engagement with the rotating drive roll. The drive roll and belt form a nip through which the belt is rotated. A heater can be located internal to the belt for heating the belt. In such fixing devices, a stripping wire can optionally be located internally to the belt to strip substrates from the outer surface of the belt after the substrates have been heated to treat marking material on the substrates at the nip. Exemplary fixing devices in which the air knives can be used to assist stripping of substrates from the belt are disclosed in U.S. patent application Ser. No. 12/490,601, filed Jun. 24, 2009, which is incorporated herein by reference in its entirety.

Figure 9:
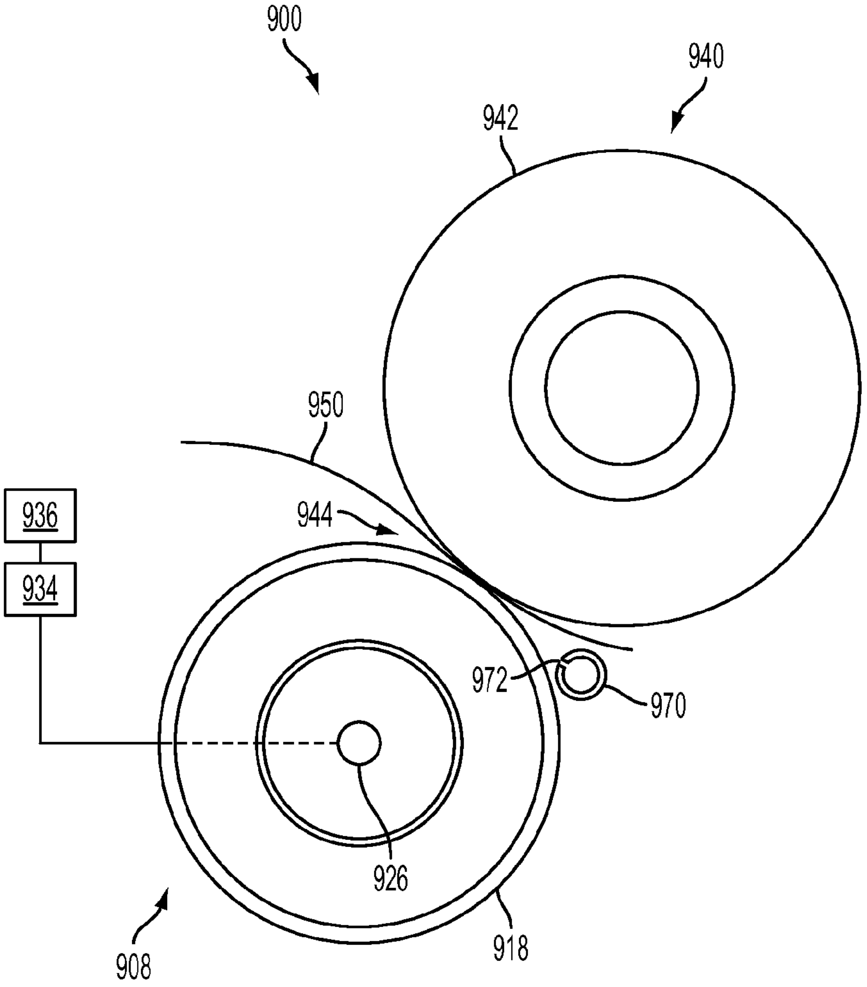
FIG. 9 depicts an exemplary embodiment of a fixing device including a fuser roll, pressure roll and an air knife.

Embodiments of the stripping wires can also be used in apparatuses useful in printing that do not include a belt (such as the belt 202, 302 or 502), but which include opposed rolls that form a nip. FIG. 9 depicts an exemplary embodiment of a fixing device 900 including a fuser roll 908 and a pressure roll 940 including respective outer surfaces 918 and 942 forming a nip 944 to which substrates, such as substrate 950, are fed to apply heat and pressure to marking materials on the substrates. The fuser roll 908 includes an internal heater 926 connected to a power supply 934, which is connected to a controller 936. A low-profile air knife 970 including nozzles 972 is disposed to assist stripping of substrates from the outer surface 918 of the fuser roll 908. The air knife 970 can have a structure as that of the air knives 270, 370 and 570 shown in FIGS. 2, 3 and 5, for example.

Embodiments of the low-profile air knives, such as the air knives 370, 470, 570 and 970, can also provide cost savings by being manufactured at low manufacturing costs as compared to more air knives with more complicated structures.

For example, embodiments of the air knife having a circular cross-section, such as the air knives 270, 370 and 570, can be produced from a hollow tube of a suitable metal or plastic material. The nozzles can be formed through the wall of the tube using any suitable drilling technique that forms holes with the desired shape and tolerances. The thickness of the wall of the tube is sufficient to provide the desired strength and to allow the nozzles to be formed in it.

The gas-ejection performance of embodiments of the low-profile air knives can be improved by utilizing the following exemplary design considerations. For plenum pressure uniformity (which ensures nozzle performance uniformity), the combined cross-sectional area of the gas inlets is at least ten times greater than the total cross-sectional area of all of the nozzles. For an exemplary embodiment of an air knife having a circular cross-section (such as shown in FIGS. 3 and 5) and including, e.g., sixteen nozzles each having a diameter of about 0.75 mm, as the air knife includes two inlets (one at each end) each having the same cross-sectional flow area as the tube, to adequately supply gas to each of the nozzles, the diameter of the tube is at least about 6.8 mm. Any other combination of nozzle number and size will be suitable with an internal cross-sectional area at least 5 times the aggregate area of the nozzles.

The wall thickness of the tube of the air knife is desirably about three times the diameter of the nozzles. For a nozzle diameter of 0.75 mm, a wall thickness of the tube of about 2.3 mm is desirable. It is also desirable that the surfaces defining the nozzles be smooth.

Based on the these considerations, a hollow tube having an inner diameter of about 3/8 inch (about 9.5 mm), and a wall thickness of about 3/32 inch (about 2.4 mm) with sixteen equally-spaced nozzles each having a diameter of 0.75 mm diameter can provide high gas flow uniformity in a low-profile air knife at a low cost.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. An apparatus useful in printing, comprising:

a first member configured to move about an axis, the first member having a first surface;

at least one heating element for heating the first surface of the first member;

a second member including a second surface forming a nip with the first surface, the nip including an inlet end at which a substrate enters the nip and an outlet end at which the substrate exits from the nip; and an air knife disposed downstream from the outlet end of the nip and extending along a direction parallel to the axis, the air knife including a first end having a first end opening, a second end opposite the first end having a second end opening opposite to the first end opening, a plenum extending along the direction parallel to the axis between the first end and the second end, and a plurality of nozzles disposed along the direction parallel to the axis between the first end and second end; and at least two gas inlets including gas inlet through which gas is supplied to the first end opening of the air knife and a second gas inlet through which gas is supplied to the second end opening of the air knife, the first gas inlet and the second gas inlet being configured to cause the plenum to have a substantially uniform gas pressure when the gas is supplied to both the first end opening through the first gas inlet and to the second end opening through the second gas inlet to thereby cause substantially identical gas flow characteristics for each of the plurality of nozzles, wherein the nozzles are oriented to eject the gas toward the first surface downstream from the outlet end of the nip to facilitate stripping of the substrate from the first surface; and wherein the air knife has a configuration and is positioned with respect to the outlet end of the nip such that the substrate does not contact the air knife after exiting the outlet end of the nip when the nozzle gas ejection is ON or OFF.

2. The apparatus of claim 1, wherein:

the first member is a first roll including the first surface and the at least one heating element; and the second member is a second roll including the second surface.

3. The apparatus of claim 1, wherein:

the first member is a belt including the first surface and an opposite inner surface;

a first roll contacts the inner surface of the belt; and the second member is a roll including the second surface.

4. The apparatus of claim 3, further comprising a stripping device contacting the inner surface of the belt, the stripping device producing a stripping force to facilitate stripping of the substrate from the first surface of the belt.

5. The apparatus of claim 1, wherein the air knife has a circular cross-section.

6. The apparatus of claim 1, wherein the air knife has a triangular cross-section.

7. The apparatus of claim 1, wherein the nozzles have the about the same cross-sectional area and are substantially equally spaced from each other.

8. The apparatus of claim 1, further comprising a printer module for applying a marking material to the substrate before the substrate enters the nip.

9. The device of claim 1, wherein:

the first member is a belt including the first surface and an opposite inner surface;

a first roll contacts the inner surface of the belt, the first roll including at least one heating element for heating the first surface of the belt; and the second member is a second roll including the second surface.

10. The device of claim 9, further comprising a stripping device contacting the inner surface of the belt, the stripping device producing a stripping force sufficient to facilitate stripping of the substrate from the first surface of the belt.

11. The device of claim 10, wherein the stripping device is a tensioned stripping wire spaced from the second surface.

* * * * *